UNITED STATES PATENT OFFICE.

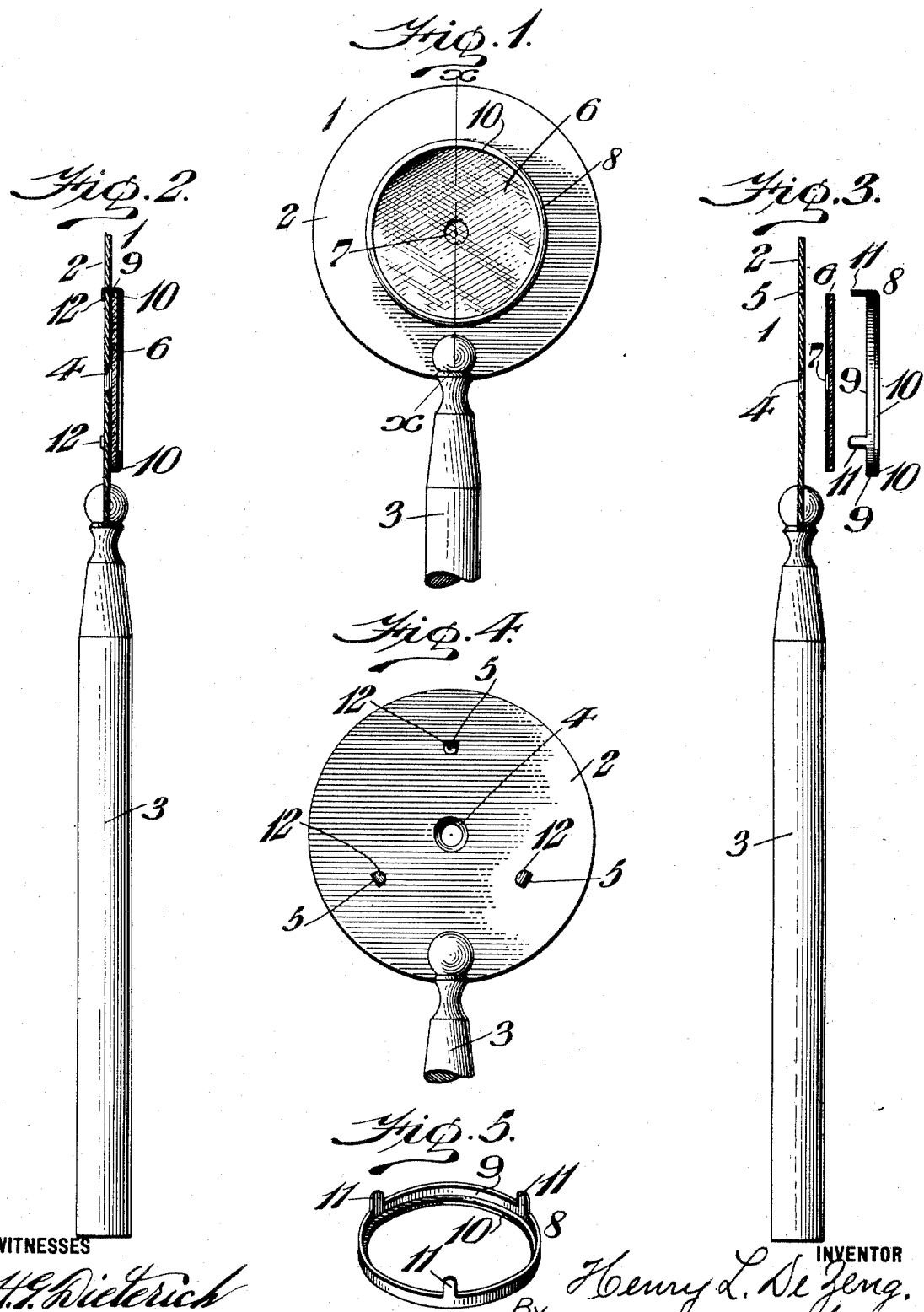

HENRY L. DE ZENG, OF MAPLE SHADE, NEW JERSEY.

OPTICAL INSTRUMENT.

1,068,236.

Specification of Letters Patent.     Patented July 22, 1913.

Application filed November 26, 1912. Serial No. 733,602.

*To all whom it may concern:*

Be it known that I, HENRY L. DE ZENG, a citizen of the United States, residing at Maple Shade, in the county of Burlington, State of New Jersey, have invented a new and useful Optical Instrument, of which the following is a specification.

My invention relates to optical instruments, and consists in providing a new and novel securing means for holding parts of the device in position.

It further consists of an optical instrument provided with a mirror or reflector, and means for removably securing the same in position.

It further consists of novel details of construction, as will be hereinafter set forth.

Figure 1 represents a front elevation of a retinoscope embodying my invention, with the handle broken. Fig. 2 represents a sectional view on line x—x Fig. 1, showing the handle in full. Fig. 3 represents a sectional view with the parts in detached or separated position. Fig. 4 represents a rear view of the device seen in Fig. 1. Fig. 5 represents a perspective view of the clamping device.

For the purpose of illustrating my invention, I have shown the same as applied to a retinoscope, although it will be understood that the invention may be adapted for other purposes than that shown and described, and I do not therefore desire to be limited in every instance to the form of optical instrument disclosed, nor to the exact mechanical construction set forth, since such construction is one of various mechanical forms in which the principle of the invention may be used.

Heretofore in retinoscopes, the mirror or reflector has been secured to the disk in different ways, as for example by cement. This is objectionable, for the reason that the cement will dry and crack so that the mirror will become detached, and in addition, it has been found that the cement would affect the reflecting medium on the back of the mirror, thus destroying the usefulness thereof. The mirror or reflector has also been secured to the disk by burnishing the metal over the edge of the said reflector. The disadvantage of this method of securing the reflector, is that the pressure exerted upon the reflector causes distortion of its face, and the light is not properly reflected therefrom, which is absolutely fatal to its correct performance. Should for any reason it be desired to remove and replace the mirror, as is frequently required, it would be impossible to do so without destroying the holding means, so that the entire instrument would be useless, unless cementing was resorted to, the metal having been removed in the process of removing the mirror.

My invention is designed to overcome these defects, as will be hereinafter pointed out.

Similar numerals of reference indicate corresponding parts in the figures. Referring to the drawings: As above stated, while I have shown in the drawings my invention as applied to a retinoscope, the features of my invention are adapted for securing union of any optical instrument.

1 designates a retinoscope consisting of a disk or plate 2, which serves as a support, to which is suitably connected a handle 3. The support 2 is provided with the opening 4 and also with a plurality of small openings or slots 5, each of which is arranged at a suitable distance with respect to the opening 4, and at intervals therearound, as here shown, there being three of these small openings.

6 designates a mirror or reflector of any suitable or desired construction, which is preferably round and which is adapted to be firmly connected with the support 2. A suitable part of the mirror is free from reflecting material, forming a sight opening 7, which is adapted to be held in alinement with the opening 4 of the support.

8 designates a securing device for removably holding the mirror 6 on the support 2, and, as here shown, the device consists of the side wall or ring 9 having a laterally extending member 10 projecting from the upper portion thereof, and extending from the lower portion thereof are a suitable number of fingers or members 11. As here shown, there are three to correspond to the number of small openings 5 in the support 2. The side wall or ring 9 is preferably of a suitable depth with respect to the thickness of the mirror, that is, it is of suitable extent in order that the laterally extending member 10 will properly engage the outer portions of the mirror 6, when the same is in position with its rear face seated upon the support 2, whereby said mirror will be held in place when the members 11 are seated in the smaller openings 5 in the support 2, and a suitable portion of said members 11 are clamped or clenched, as at 12, against the rear face of said support to firmly and securely connect the securing device with the said support 2.

By reason of the above construction, it will be understood that the reflector is removably held upon the support; that is to say, by the proper manipulation of the bent ends of the fingers 11, the securing device can be quickly and easily removed, and the glass replaced, after which the securing means is returned to its position and locked with respect to the support. By this means it will be understood that the reflecting material of the mirror will not be subjected to any injurious substances, the edge of the mirror will be protected, and the securing device will firmly hold the mirror in suitable relation to the support 2.

Having thus described my invention, what I claim as new and desire to secure by Letters Patent, is:—

1. In a device of the character stated, a support, a reflector, and a securing device having a portion thereof engaging an outer portion of said reflector, and gripping means on said securing device for holding said securing device to said support for fastening the said reflector thereto.

2. In a device of the character stated, a support, a reflector, and a securing device having a portion thereof engaging an outer portion of said reflector, and fingers carried by said securing device and engaging said support for fastening the said reflector thereto.

3. In a device of the character stated, a support having an opening therein and having additional openings at suitable points with respect to said first opening, a reflector having a sight opening adapted to be in alinement with the said first opening in the support, and a securing device having a portion thereof engaging a suitable outer portion of said reflector and having fingers passing through said additional openings and secured at the rear face of said support.

4. In a device of the character stated, a support having an opening therein and a plurality of small openings therein at suitable points with respect to said first mentioned opening, a reflector having a sight opening therein adapted to be in alinement with the said first mentioned opening in said support, and a securing device having side walls of substantially the same depth as the thickness of said reflector with a portion of said device engaging a suitable outer portion of said reflector and with members adapted to pass through said small openings and to be secured at the rear face of said support.

HENRY L. DE ZENG.

Witnesses:
C. D. McVay,
F. A. Newton.